O. NELSON.
VALVE LIFTER.
APPLICATION FILED JAN. 29, 1919.

1,348,658. Patented Aug. 3, 1920.

Witness:
R. L. Farrington

Inventor.
Otto Nelson,
By Brown & Andrew
Attys.

UNITED STATES PATENT OFFICE.

OTTO NELSON, OF CHICAGO, ILLINOIS.

VALVE-LIFTER.

1,348,658.  Specification of Letters Patent.  Patented Aug. 3, 1920.

Application filed January 29, 1919. Serial No. 273,802.

*To all whom it may concern:*

Be it known that I, OTTO NELSON, a citizen of the United States, residing at Chicago, in the county of Cook and State of Illinois, have invented certain new and useful Improvements in Valve-Lifters, of which the following is a specification.

My invention relates to valve lifters, and has for its object the provision of a simple and efficient device of the character mentioned adapted to facilitate the quick and easy adjustment and removal of a valve from an internal combustion engine, and the like.

A further object is the provision of means for adjusting the valve stem-engaging portions of the lifter to accommodate various sizes of valve stems.

Other objects will appear hereinafter.

An embodiment of my invention is shown in the accompanying drawing, forming a part of this specification, and in which—

Figure 1:
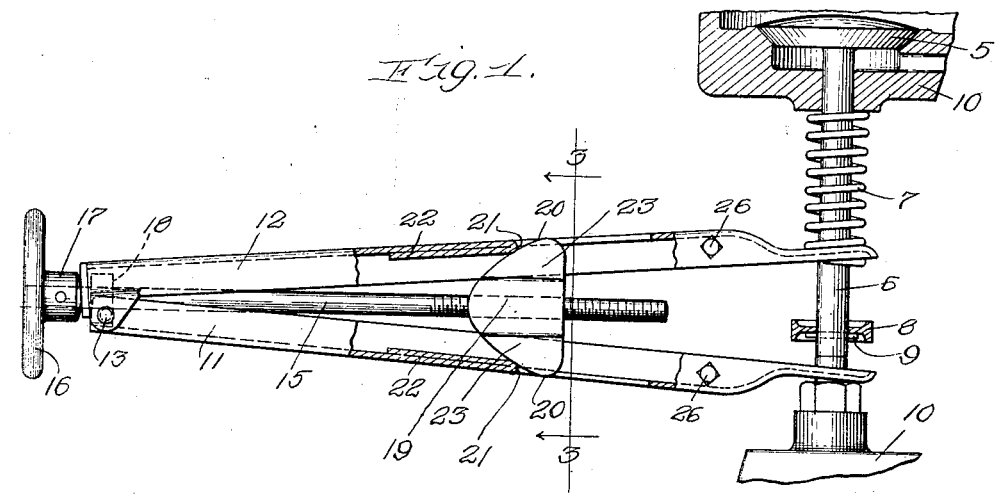
Figure 1 is a side view of a device embodying my invention with portions broken away to expose underlying parts; it also illustrates the application of my improvement to a valve stem.

Referring more particularly to the drawing, I have illustrated more or less accurately a valve 5, valve stem 6, valve spring 7, washer 8, pin 9, and portions of an engine casting 10 to illustrate the application of my invention to remove a valve.

My device consists of two jaws 11 and 12, pivoted together as at 13. I have indicated the jaws 11 and 12 as being made up of sheet material cut out and struck up, but it will be apparent to those skilled in the art that these jaws may be made of cast material or forgings. The pivotal connection 13 is simply suggestive, and any means for pivoting the jaws 11 and 12 together may be provided.

Figure 4:
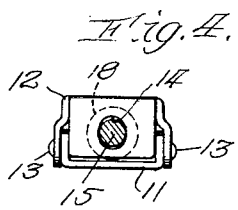
Fig. 4 is a section taken on line 4—4 of Fig. 2.

Adjacent the pivotal connection 13 I provide a bearing 14 for a screw rod 15. The bearing 14 is preferably wider in the direction the jaws spread than in the other direction, see particularly Fig. 4, so that when the jaws 11 and 12 spread, the screw rod 15 will not bind, and be free to rotate. The screw rod 15 is preferably provided with a handwheel 16 which may have a shoulder 17 which engages an adjacent portion of one of the jaws 11 and 12, such as indicated in Fig. 1, to prevent movement of the screw rod 15 in one longitudinal direction. It is not essential to hold the screw rod 15 against longitudinal movement in the other direction, but for convenience I prefer to provide a collar 18 on the screw rod, substantially as indicated in Figs. 1 and 2, so that there will be but slight longitudinal movement of the screw rod 15 so as to make the implement more convenient in use.

On the screw rod 15 is threaded a wedge member 19 which has two inclined surfaces 20 adapted to engage shoulders 21 on the jaws 11 and 12. The shoulders 21 may be provided in any desirable manner, but when the jaws 11 and 12 are made of sheet metal I find it is a good plan to strike out portions 22 from the jaws 11 and 12, bending these portions onto adjacent sides of said jaws, as clearly indicated in Fig. 1, so as to provide rounded shoulders 21 for the engagement of the surfaces 20 of the wedge. The wedge 19 is preferably provided with shoulder portions 23 which facilitate keeping the device in convenient form when not in use.

I preferably provide a slot 24 in each of the jaws 11 and 12. The slot 24 is preferably narrower at its outer end than its inner end, the latter being the end adjacent the shoulder 21. This construction also facilitates making the prongs 25 adjacent the shoulders 21 more yieldable than if these prongs 25 were of considerable thickness. In each of the jaws 11 and 12 I provide a screw 26 which is adapted to move the prongs 25 of each jaw toward and away from each other. Any other convenient means may be provided for moving or adjusting the prongs 25. I find a convenient method is to thread a screw 26 in one prong 25 and provide a shoulder on the screw 26 mounted in a suitable bearing in the other prong 25, such as indicated at 27 in Fig. 2.

Figure 2:
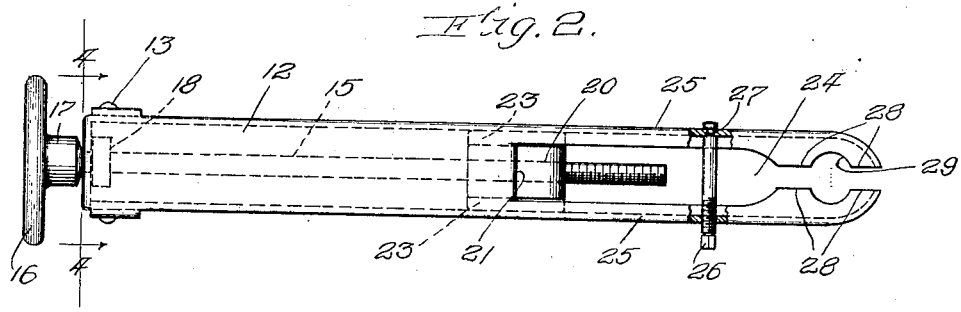
Fig. 2 is a plan view of my improved valve lifter with portions broken away to show underlying parts.
Figure 3:
Fig. 3 is a section taken on line 3—3 of Fig. 1.
Figure 3:
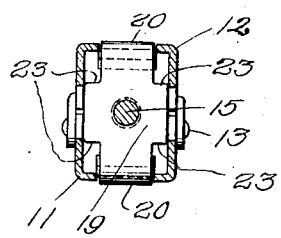

In the adjacent sides of the prongs 25 of each jaw 11 and 12, I preferably provide a portion of such sides parallel, such as indicated at 28 in Fig. 2, and between the parallel portions I provide curved portions 29. It is found in the art that valve stems 6 vary considerably in diameter, and also the washers 8 sometimes are very small in diameter. Therefore by providing an adjustment of the prongs 25, such as by the screws 26, I am able to move the prongs 25 until they are brought quite close to the sides of the valve stem 6. In order to get a good bearing surface on the parts to be engaged, I find a good plan is to make the recesses 29 so that substantially all of the curved surfaces of the recesses 29 also engage the valve stem 6, thereby providing an effectual bearing for raising the spring and permitting the removal of the washer 8 and pin 9 so as to free the valve 5 and valve stem 6.

I claim:—

1. A valve lifter comprising two coöperating jaws with a slot in one end of each jaw dividing said jaw end into two prongs, there being a shoulder at the inner end of each of said slots; and a wedge disposed between said jaws and engaging said shoulders.

2. A valve lifter comprising two coöperating jaws with a slot in one end of each jaw dividing said jaw end into two prongs, there being a shoulder at the inner end of each of said slots; a wedge disposed between said jaws and engaging said shoulders; and means for moving the prongs of each jaw toward each other.

3. A valve lifter comprising two jaws pivoted together, there being a slot in one end of one of said jaws dividing said jaw into a pair of prongs; and a screw extending through said prongs, said screw being held against longitudinal movement in one prong and threaded in the other prong.

4. A valve lifter comprising two jaws pivoted together with a slot in one end of each jaw dividing said jaw end into two prongs, there being a shoulder at the inner end of each of said slots; a wedge disposed between said jaws and engaging said shoulders; a screw having a bearing adjacent the pivotal point of said jaws and threaded in said wedge; and a screw extending through said prongs, said screw being threaded in one of said prongs and held against longitudinal movement in the other prong.

5. A valve lifter comprising two coöperating jaws with a slot in one end of each jaw dividing said jaw end into two prongs, there being portions of the material of the jaws at the inner ends of the slots disposed between the jaws providing rounded shoulders; a wedge mounted between said jaws and engaging said shoulders; and means for moving said wedge toward said shoulders for spreading the jaws apart.

In testimony whereof I have signed my name to this specification on this 23rd day of January A. D. 1919.

OTTO NELSON.